(12) United States Patent
Horwatt et al.

(10) Patent No.: US 10,570,270 B2
(45) Date of Patent: Feb. 25, 2020

(54) POLYOLEFIN MATERIALS FOR ROTATIONAL MOLDING APPLICATIONS HAVING IMPROVED IMPACT PROPERTIES AND COLOR STABILITY

(71) Applicant: Equistar Chemicals, LP, Houston, TX (US)

(72) Inventors: Steven W. Horwatt, West Chester, OH (US); Kelly A. Enderle, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 106 days.

(21) Appl. No.: 15/815,437

(22) Filed: Nov. 16, 2017

(65) Prior Publication Data

US 2018/0142081 A1 May 24, 2018

Related U.S. Application Data

(60) Provisional application No. 62/424,173, filed on Nov. 18, 2016.

(51) Int. Cl.
| | | |
|---|---|---|
| C08K 5/3492 | (2006.01) | |
| C08K 5/524 | (2006.01) | |
| C08L 23/08 | (2006.01) | |
| B29C 41/00 | (2006.01) | |
| C08K 5/526 | (2006.01) | |
| C08K 5/13 | (2006.01) | |
| C08K 3/26 | (2006.01) | |
| C08K 5/098 | (2006.01) | |

(52) U.S. Cl.
CPC ........ *C08K 5/34924* (2013.01); *B29C 41/003* (2013.01); *C08K 3/26* (2013.01); *C08K 5/098* (2013.01); *C08K 5/13* (2013.01); *C08K 5/34922* (2013.01); *C08K 5/34926* (2013.01); *C08K 5/524* (2013.01); *C08K 5/526* (2013.01); *C08L 23/0815* (2013.01); *C08K 2003/267* (2013.01)

(58) Field of Classification Search
CPC ........ C08K 5/3492; C08K 5/524; C08L 23/08
USPC ....................................................... 524/101
See application file for complete search history.

(56) References Cited

U.S. PATENT DOCUMENTS

| | | | |
|---|---|---|---|
| 6,902,695 B2 | 6/2005 | Stadler | |
| 2005/0261403 A1 | 11/2005 | Tikuisis et al. | |
| 2006/0047029 A1* | 3/2006 | Poloso | C08K 5/0008 524/86 |
| 2007/0078203 A1* | 4/2007 | Gohill | C07F 9/65744 524/117 |
| 2009/0283939 A1* | 11/2009 | Turner | C08L 23/04 264/500 |
| 2010/0187726 A1 | 7/2010 | Gibbons et al. | |
| 2011/0136983 A1* | 6/2011 | Kapur | B29C 49/0005 525/240 |
| 2012/0146257 A1 | 6/2012 | Eng et al. | |
| 2014/0127438 A1 | 5/2014 | Sherman | |
| 2014/0288225 A1* | 9/2014 | Shipley | C08L 23/16 524/451 |
| 2016/0229964 A1 | 8/2016 | Bellehumeur | |

FOREIGN PATENT DOCUMENTS

| | | |
|---|---|---|
| CN | 103571026 A | 2/2014 |
| WO | 9519391 A1 | 7/1995 |

OTHER PUBLICATIONS

International Search Report and Written Opinion dated Feb. 13, 2018 (Feb. 13, 2018) for Corresponding PCT/US2017/062069.

* cited by examiner

*Primary Examiner* — Deve V Hall

(57) ABSTRACT

Provided herein are polyolefin-based compositions useful for making rotomolded parts having useful properties, including those related to impact resistance and color. In one aspect, there are provided compositions comprising (a) a rotational molded polyolefin, comprising a resin, wherein the resin is polyethylene or a copolymer thereof, having a melt index (MI) ranging from about 1 g/10 minutes to about 10 g/10 minutes; and (b) an additive package comprising: (i) an antioxidant; (ii) a processing stabilizer; (iii) optionally a UV light stabilizer; (iv) optionally a fatty acid-based acid scavenger comprising a metal salt of a fatty acid; and (v) a dihydrotalcite-based acid scavenger present in the composition at between about 800 ppm to about 3,000 ppm. In some embodiments, the ARM Impact Percent Ductility is greater than or equal to about 60% for a molded part made from the cured composition and measured after the composition has been cured between 18-24 minutes at a temperature of 550° F.

18 Claims, 1 Drawing Sheet

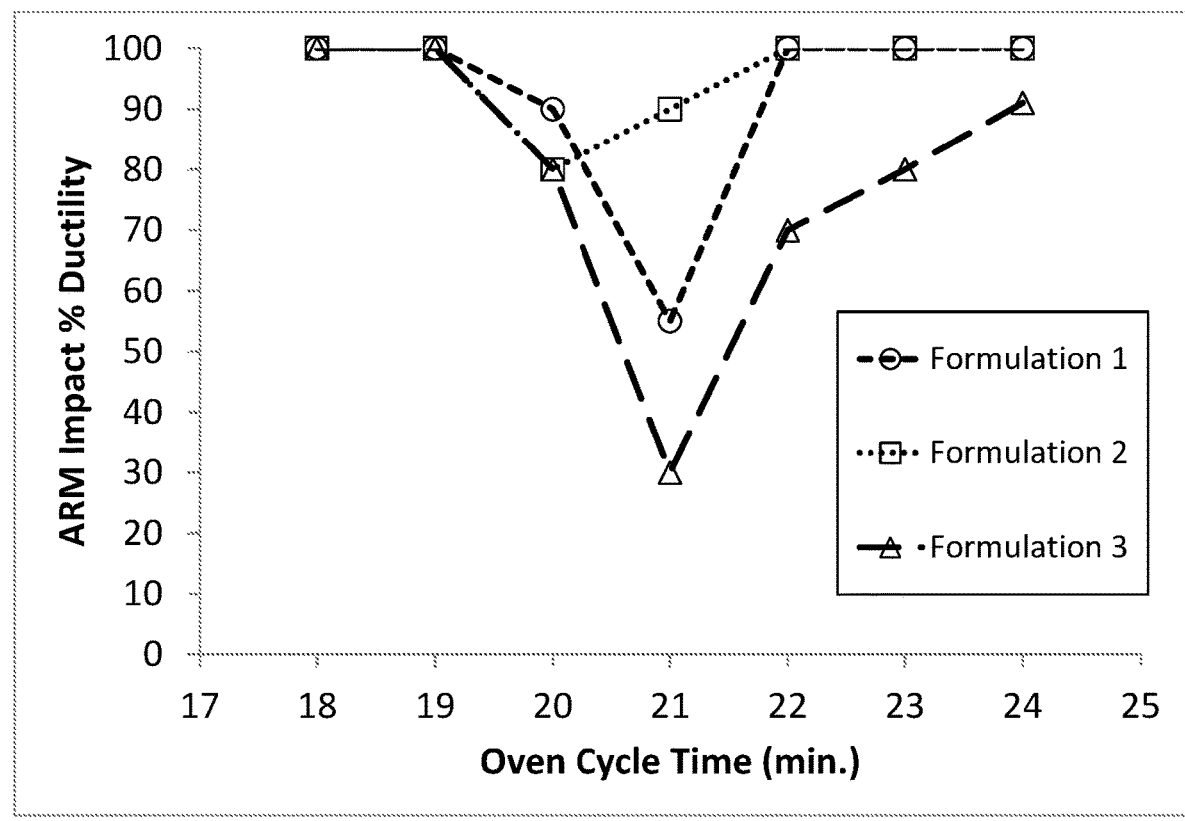

POLYOLEFIN MATERIALS FOR ROTATIONAL MOLDING APPLICATIONS HAVING IMPROVED IMPACT PROPERTIES AND COLOR STABILITY

CROSS-REFERENCE TO RELATED APPLICATIONS

This application is the Non-Provisional Patent Application, which claims benefit of priority to U.S. Provisional Application No. 62/424,173, filed Nov. 18, 2016, the contents of which are incorporated herein by reference in their entirety.

BACKGROUND

Field of the Invention

In general, the present disclosure relates to the field of chemistry. More specifically, the present disclosure relates to polyolefin-based compositions. In particular, the polyolefin-based compositions disclosed herein are useful as components rotational molded applications.

Description of Related Art

Rotational molding—also referred to as rotomolding or rotational casting—is a fast growing plastic processing method. Rotational molding techniques—coupled with Microthene® polyolefin powders from LyondellBasell—may be used to make hollow items of widely varying sizes, open or closed, and shapes.

In rotational molding, impact strength may be used as both a performance property and a measurement of the level of cure for quality control purposes. At short cure times, impact strength may be low and the fracture mode may be brittle. As the molded part reaches optimal cure, the impact strength may reach a plateau and the fracture may become 100% ductile. At cure times longer than this optimal time, some materials may exhibit a decline in impact strength and a transition back to a brittle fracture mechanism.

Provided herein are rotational molded polyolefin compositions that maintain a good balance of properties, including those related to impact strength and color stability over a wider range of conditions, including at prolonged cure times.

SUMMARY OF THE INVENTION

In one aspect, the present disclosure provides compositions comprising: (a) a rotational molded polyolefin, comprising a resin, wherein the resin is polyethylene or a copolymer thereof, having a melt index ("MI") ranging from about 1 gram ("g") g/10 minutes to about 10 g/10 minutes (alternatively from about 1.5 g/10 minutes to about 10 g/10 minutes; alternatively from about 2 g/10 minutes to about 10 g/10 minutes; alternatively from about 2 g/10 minutes to about 8 g/10 minutes); and (b) an additive package comprising: (i) an antioxidant; (ii) a processing stabilizer; (iii) optionally a UV light stabilizer; (iv) optionally a fatty acid-based acid scavenger comprising a metal salt of a fatty acid; and (v) a dihydrotalcite-based acid scavenger present in the composition at between about 800 ppm to about 3,000 ppm.

In some embodiments, the rotational molded polyolefin comprises an ethylene-hexene copolymer. In some of these embodiments, the 1-hexene monomer amount in the ethylene-hexene copolymer ranging from about 1.5% by weight to about 6.5% by weight, and alternatively about 2% by weight.

In some embodiments, the rotational molded polyolefin was made using a gas-phase process and a Ziegler-Natta catalyst.

In some embodiments, the antioxidant is a sterically hindered phenolic antioxidant, for example, 1,3,5-tris[4-hydroxy-3,5-bis(2-methyl-2-propanyl)benzyl]-1,3,5-triazinane-2,4,6-trione, for example, IRGANOX® 3114. In some embodiments, the sterically hindered phenolic antioxidant is present in the composition at between about 200 ppm to about 500 ppm. In some of these embodiments, the sterically hindered phenolic antioxidant is present in the composition at between about 300 ppm to about 350 ppm. In some of these embodiments, the sterically hindered phenolic antioxidant is present in the composition at about 325 ppm.

In some embodiments, the processing stabilizer is a hydrolytically stable organophosphite processing stabilizer. In some of these embodiments, the processing stabilizer is tris(2,4-di-tert-butylphenyl)phosphite, for example, IRGAFOS® 168. In some embodiments, the processing stabilizer is present in the composition at between about 500 ppm to about 1,500 ppm. In some of these embodiments, the processing stabilizer is present in the composition at between 800 ppm to 1,000 ppm. In some of these embodiments, the processing stabilizer is present in the composition at about 900 ppm.

In some embodiments, the UV light stabilizer is a polymer or oligomer comprising hindered amine groups. In some of these embodiments, the UV light stabilizer is poly [(6-morpholino-s-triazine-2,4-diyl)[2,2,6,6-tetramethyl-4-piperidyl) imino]-hexamethylene [(2,2,6,6-tetramethyl-4-piperidyl) imino]], for example, CYASORB® UV-3346. In some embodiments, the UV light stabilizer is present in the composition at between about 1,000 ppm to about 3,000 ppm. In some of these embodiments, the UV light stabilizer is present in the composition at between about 1,500 ppm to about 2,500 ppm. In some of these embodiments, the UV light stabilizer is present in the composition at about 2,000 ppm.

In some embodiments, the metal salt of a fatty acid is zinc stearate. In some embodiments, the zinc stearate is present in the composition at between about 200 ppm to about 500 ppm. In some of these embodiments, the zinc stearate is present in the composition at about 350 ppm. In some embodiments, In some embodiments, the dihydrotalcite-based acid scavenger comprises hydrotalcite or hydrotalcite-like mineral. In some embodiments, the dihydrotalcite-based acid scavenger further comprises a surface active agent. In some embodiments, the surface active agent is animal or vegetable based. In some embodiments, the dihydrotalcite-based acid scavenger is DHT-4V. In some embodiments, the dihydrotalcite-based acid scavenger is DHT-4A®. In some embodiments, the dihydrotalcite-based acid scavenger is present in the composition at between about 900 ppm and about 1,500 ppm. In some of these embodiments, the dihydrotalcite-based acid scavenger is present in the composition at about 1,000 ppm.

In some embodiments, the ARM Impact Percent Ductility is greater than or equal to about 60% (alternatively greater than or equal to about 90%) for a molded part having a wall thickness of about ⅛ inch (0.32 cm) and made from the cured composition and measured after the composition has been cured between 18-24 minutes at a temperature of 550° F. (288° C.).

In some embodiments, the yellowness index of the composition is less than or equal to about 30 after the composition has been cured between 18-24 minutes at a temperature at a temperature of 550° F., wherein the yellowness index of the composition is determined according to ASTM E313 15e1. In some of these embodiments, the yellowness index of the composition is less than or equal to about 29. In some of these embodiments, the yellowness index of the composition is less than or equal to about 28.

In another aspect, the present disclosure provides articles of manufacture formed from any of the above compositions. In some embodiments, the article is a molded part.

While multiple embodiments are disclosed, still other embodiments will become apparent to those skilled in the art from the following detailed description. As will be apparent, certain embodiments, as disclosed herein, are capable of modifications in various aspects, without departing from the spirit and scope of the claims as presented herein. Accordingly, the drawings and detailed description are to be regarded as illustrative in nature and not restrictive.

BRIEF DESCRIPTION OF THE DRAWINGS

The following drawings form part of the present specification and are included to further demonstrate certain aspects of the present claims. The claims may be better understood by reference to the drawing FIGURE in combination with the detailed description of specific embodiments presented herein.

The FIGURE: ARM Impact Percent Ductility for molded parts made from formulations 1-3 having a wall thickness of about ⅛ inch (0.32 cm) and made from the cured composition and measured after the composition have been cured between 18-24 minutes at a temperature of 550° F.

DETAILED DESCRIPTION

Provided herein are polyolefin-based compositions useful for making rotomolded part(s) having useful properties, including those related to impact resistance and color stability. Applications for these parts may include storage tanks, containers for packaging, automotive parts, playground equipment, sporting equipment, and the like.

In one aspect of the present disclosure, there are provided compositions comprising:
(a) a rotational molded polyolefin, comprising a resin, wherein the resin is polyethylene or a copolymer thereof, having a melt index (MI) ranging from about 1 g/10 minutes to about 10 g/10 minutes; and
(b) an additive package comprising:
an antioxidant;
a processing stabilizer;
optionally a UV light stabilizer;
optionally a fatty acid-based acid scavenger comprising a metal salt of a fatty acid; and
a dihydrotalcite-based acid scavenger present in the composition at between about 800 ppm to about 3,000 ppm.

In some embodiments, the ARM Impact Percent Ductility, as defined below, is greater than or equal to about 60% (alternatively about 65%, alternatively about 60%, alternatively about 75%, alternatively about 80%, alternatively about 90%) for a molded part having a wall thickness of about ⅛ inch (0.32 cm) and made from the cured composition and measured after the composition has been cured between 18-24 minutes at a temperature of 550° F. (288° C.).

In some embodiments, the yellowness index of the composition, which may be used as a measure of color stability, is less than or equal to about 30 after the composition has been cured between 18-24 minutes at a temperature at a temperature of 550° F. (288° C.), wherein the yellowness index of the composition is determined according to ASTM E313 15e1 (defined below). In some embodiments, the yellowness index of the composition is less than or equal to about 29. In some embodiments, the yellowness index of the composition is less than or equal to about 28. In some embodiments, the yellowness index of the composition is less than or equal to about 27.

I. Rotomolded Polyolefins

Resins that resist chemical degradation at high temperatures may be used in the rotomolding process. In some embodiments, a resin will have a good flow when molten. With polyethylene, the flow may be measured by melt index (MI), which is defined below. Higher melt indexes may indicate better flow. In some embodiments, rotomolding resins will have melt indices ranging from about 1 g/10 minutes to about 10 g/10 minutes. The term "g/10 minutes" refers to the weight of molten resin moving through an orifice of a predetermined size in 10 minutes according to ASTM D1238 (as explained further below). The melt index may also be a rough measure of the molecular weight or the chain length of a resin. A resin with a high melt index may have shorter chains and a lower molecular weight or smaller molecules. A resin with a low melt index may have longer chains and a higher molecular weight or larger molecules.

Polydispersity is the ratio of weight average molecular weight to number average molecular weight ($M_w/M_n$) as measured by gel permeation chromatography (GPC) (explained below). For certain applications, a narrow molecular weight distribution (low polydispersity) is desired. In some embodiments, the rotational molded polyolefin may have a $M_w/M_n$ ranging from about 3 to about 7; alternatively about 5.

Several different types of polyethylene or copolymers thereof may be used as the resins for the compositions provided herein, including:
Low Density Polyethylene (LDPE) may be flexible and tough, easy to process and chemically resistant.
Linear Low Density Polyethylene (LLDPE) or Linear Medium Density Polyethylene (LMDPE) may have better mechanical properties than LDPE as well as higher stiffness, better low temperature impact strength and better environmental stress crack resistance (as compared to LDPE).
High Density Polyethylene (HDPE) may be the stiffer than LDPE, LMDPE, and LLDPE. HDPE may have good chemical resistance and good processability.

In some embodiments, the rotational molded polyolefin may have a density ranging from about 0.935 to about 0.946. In some embodiments, the rotational molded polyolefin may have an ethylene-hexene copolymer. In some embodiments, the 1-hexene monomer amount in the ethylene-hexene copolymer ranges from about 1.5% by weight to about 6.5% by weight, alternatively from about 1.5% by weight to about 2.5% by weight, alternatively from about 2.0% by weight to about 2.5% by weight, alternatively about 2% by weight. In some embodiments, the ethylene-hexene copolymer is a 1-hexene-HDPE copolymer.

II. Additive Packages

In one aspect of the present disclosure, there are provided additive packages comprising:

an antioxidant;
a processing stabilizer;
optionally a UV light stabilizer;
optionally a fatty acid-based acid scavenger comprising a metal salt of a fatty acid; and
a dihydrotalcite-based acid scavenger present in the composition at between about 800 ppm to about 3,000 ppm.

In some embodiments, the antioxidant is a sterically hindered phenolic antioxidant. In some embodiments, the sterically hindered phenolic antioxidant is 1,3,5-tris[4-hydroxy-3,5-bis(2-methyl-2-propanyl)benzyl]-1,3,5-triazinane-2,4,6-trione. In some embodiments, the antioxidant is Irganox® 3114. In some embodiments, the sterically hindered phenolic antioxidant is present in the composition at between about 200 ppm to about 500 ppm. In some embodiments, the sterically hindered phenolic antioxidant is present in the composition at between about 300 ppm to about 350 ppm. In some embodiments, the sterically hindered phenolic antioxidant is present in the composition at about 325 ppm.

In some embodiments, the processing stabilizer is a hydrolytically stable organophosphite processing stabilizer. In some embodiments, the processing stabilizer is tris(2,4-di-tert-butylphenyl)phosphite. In some embodiments, the processing stabilizer is IRGAFOS® 168. In some embodiments, the processing stabilizer is present in the composition at between about 500 ppm to about 1,500 ppm. In some embodiments, the processing stabilizer is present in the composition at between about 800 ppm to about 1,000 ppm. In some embodiments, the processing stabilizer is present in the composition at about 900 ppm. U.S. Pat. No. 6,902,695, which is incorporated herein by reference, provides additional information regarding processing stabilizers that may be used in accordance with this disclosure.

In some embodiments, the UV light stabilizer is a polymer or oligomer comprising hindered amine groups. In some embodiments, the UV light stabilizer is poly [(6-morpholino-s-triazine-2,4-diyl)[2,2,6,6-tetramethyl-4-piperidyl) imino]-hexamethylene [(2,2,6,6-tetramethyl-4-piperidyl) imino]] or Poly[N,N'-bis(2,2,6,6-tetramethyl-4-piperidinyl)-1,6-hexanediamine-co-2,4-dichloro-6-morpholino-1,3,5-triazine]. In some embodiments, the UV light stabilizer is CYASORB® UV-3346. In some embodiments, the UV light stabilizer is present in the composition at between about 1,000 ppm to about 3,000 ppm. In some embodiments, the UV light stabilizer is present in the composition at between about 1,500 ppm to about 2,500 ppm. In some embodiments, the UV light stabilizer is present in the composition at about 2,000 ppm. U.S. Pat. No. 6,902,695, which is incorporated herein by reference, provides additional information regarding UV light stabilizers that may be used in accordance with this disclosure.

In some embodiments, the fatty acid-based acid scavenger comprises a metal salt of a fatty acid. In some embodiments, the fatty acid-based acid scavenger is magnesium stearate, calcium stearate, or zinc stearate. See, for example, U.S. Pat. No. 3,886,105, which is incorporated herein by reference. In some embodiments, the metal salt of a fatty acid is zinc stearate. In some embodiments, the zinc stearate is present in the composition at between about 200 ppm to about 500 ppm. In some embodiments, the zinc stearate is present in the composition at about 350 ppm.

In some embodiments, during the preparation of various synthetic polymers, the catalyst, used in the preparation or at least the residue thereof may remain in the final product. In some embodiments, the removal of this catalyst residue substance, which may be present at levels as low as ten parts per million, is commercially impractical. However, in some embodiments, leaving the catalyst in the polymer, even at such low concentrations, may cause problems. In some embodiments, the catalysts used to polymerize olefinic monomers are halogen-containing metallic or organometallic compounds, e.g., Ziegler-Natta catalysts containing titanium tetrachloride. It has been reported that residual titanium chloride species in the polymers interfere with the functioning of stabilizers, e.g., antioxidants, that may be compounded with the polymer. Residual catalyst may also catalyze polymer degradation reactions, and, particularly with halogen-containing catalyst residue, the halogens can promote corrosion of the equipment used to compound and process the polymer.

In some embodiments, polymers that have been compounded with stabilizers, particularly thermal and light, stabilizers, exhibit a discoloration, i.e., the polymers develop a yellow or pinkish coloration. This has been attributed to the action of residual catalyst, and particularly halide ions, reacting with the stabilizers that have a phenol or a quinone functional group. Without being bound by theory, the halide may react with the phenol group to generate a colored phenolate anion.

Since some residual catalysts are acidic, an approach to overcoming the problems associated with residual catalyst is to add a basic material to the polymer, to thereby neutralize the residual catalyst. Basic materials may be referred to as neutralizer compounds or halogen-scavenging compounds. One class of halogen-scavenging compound is hydrotalcite and hydrotalcite-like materials.

In some embodiments, the dihydrotalcite-based acid scavenger comprises hydrotalcite or hydrotalcite-like mineral. In some embodiments, the dihydrotalcite-based acid scavenger further comprises a surface active agent. In some embodiments, the surface active agent is animal or vegetable based. In some embodiments, the dihydrotalcite-based acid scavenger is DHT-4V. In some embodiments, the dihydrotalcite-based acid scavenger is DHT-4A®. In some embodiments, the additive package comprises a dihydrotalcite-based acid scavenger, wherein the dihydrotalcite-based acid scavenger is magnesium aluminum hydroxy carbonate or a hydrate thereof. Magnesium aluminum hydroxy carbonate hydrates are effective in retarding hindered amine light stabilizer deactivation. One magnesium aluminum hydroxy carbonate hydrate that may be used in some embodiments of the present disclosure is sold under the trademark "DHT-4A®" by Kyowa Chemical Industry Co. Ltd.

In some embodiments, the dihydrotalcite-based acid scavenger is present in the composition at between about 900 ppm and about 1,500 ppm, alternatively between about 1000 ppm and about 1,500 ppm, alternatively between about 900 ppm and about 1,250 ppm. In some embodiments, the dihydrotalcite-based acid scavenger is present in the composition at about 1,000 ppm.

Hydrotalcite is the name given to a natural mineral having the chemical structure $Al_2Mg_6(OH)_{16}(CO_3).4(H_2O)$. The terms hydrotalcite and dihydrotalcite are used interchangeably herein. Natural hydrotalcite is an example of a basic magnesium alumino-carbonate hydrate. In some embodiments, natural hydrotalcite is contaminated with other minerals such as penninite and muscovite, as well as various heavy metals. In some embodiments, the impurity levels in natural hydrotalcite, as well as its scare occurrence around the world, have limited its commercial use giving use to the preparation of purified synthetic hydrotalcite. U.S. Pat. No. 5,250,279, which is incorporated herein by reference, describes a method for the preparation of high purity synthetic hydrotalcite having a small platelet morphology by reacting a mixture of a magnesium source, such as magnesium oxide, with an alkali metal bicarbonate, solid alumina trihydrate and an alkali metal aluminate under aqueous hydrothermal conditions at a temperature of about 160-200° C. In some embodiments, synthetic hydrotalcite may be used. See, for example, U.S. Pat. Nos. 3,650,704 and 3,539,306, which are incorporated herein by reference. In some embodiments, synthetic hydrotalcite may be made according the methods described by Salomão et al., *Ceramics International*, 37(8):3063-70, 2011 and Misra & Perrotta, *Clays and Clay Minerals*, 40(2):145-50, 1992, which are both incorporated herein by reference.

In some embodiments, the additive package further comprises one or more of the following type of substances: colorants, odorants, deodorants, plasticizers, impact modifiers, surfactants, wetting agents, flame retardants, ultraviolet light stabilizers, antioxidants, biocides, metal deactivating agents, thickening agents, heat stabilizers, defoaming agents, coupling agents, polymer alloy compatibilizing agents, blowing agents, emulsifiers, crosslinking agents, waxes, particulates, flow promoters, and other materials added to enhance processability or end-use properties of the polymeric components. Such additives may be used in conventional amounts. In some embodiments, the amounts do not exceed about 10 weight percent (wt. %) of the total weight of the composition.

In some embodiments, the additives are added individually (or in combination) to the composition directly, optionally while the composition is being blended or extruded, such that the additives are distributed approximately evenly throughout the composition. This type of additive addition may be called a "salt and pepper addition." In other embodiments, the additives may be pre-blended into a polymer carrier. The polymer carrier may be a homopolymer or copolymer of polyethylene or polypropylene. The polymer carrier having entrained additives may be referred to as a masterbatch. The masterbatch may be added while the composition is being blended or extruded such that the additives are distributed approximately evenly throughout the composition. Optionally, the polymer carrier may be between about 0.5 and about 2 weight percent of the total weight of the composition; alternatively, the polymer carrier may be about 1 weight percent of the total weight of the composition. In still further embodiments, some of the additives may be added via a masterbatch route and other additives may be added via a salt and pepper addition.

In yet another embodiment, multiple masterbatches may carry different additives. For example, a first masterbatch may carry a colorant and a second masterbatch may carry the remainder of the additives. In embodiments using multiple masterbatches, the polymer carrier of each masterbatch may be the same or different.

III. Molded Parts/Articles

In another aspect, there are provided articles of manufacture comprising one or more of the compositions disclosed herein. In some embodiments, the article is a molded part. U.S. Pat. No. 6,902,695, which is incorporated herein by reference, provides additional information regarding compositions, methods, and processes that may be used for the production of molded parts and articles or manufacture that may be used in accordance with this disclosure.

IV. Methods and Process

In another aspect, there are provided methods of making a polymer composition comprising:

(a) a rotational molded polyolefin, comprising a resin, wherein the resin is polyethylene or a copolymer thereof, having a melt index (MI) ranging from about 1 g/10 minutes to about 10 g/10 minutes; and (b) an additive package comprising:
an antioxidant;
a processing stabilizer;
optionally a UV light stabilizer;
optionally a fatty acid-based acid scavenger comprising a metal salt of a fatty acid; and
a dihydrotalcite-based acid scavenger present in the composition at between about 800 ppm to about 3,000 ppm.

Catalyst systems useful for polymerizing olefin monomers include any suitable catalyst system. For example, the catalyst system may include chromium based catalyst systems, single site transition metal catalyst systems including metallocene catalyst systems, Ziegler-Natta (Z-N) catalyst systems or combinations thereof, for example. The catalysts may be activated for subsequent polymerization and may or may not be associated with a support material, for example. A brief discussion of such catalyst systems is included below, but is in no way intended to limit the scope of the disclosure to such catalysts.

Catalyst systems useful for polymerizing olefin monomers may include Ziegler-Natta catalyst systems, for example. Ziegler-Natta catalyst systems may be formed from the combination of a metal component (e.g., a potentially active catalyst site) with one or more additional components, such as a catalyst support, a co-catalyst and/or one or more electron donors, for example.

A specific example of a Ziegler-Natta catalyst includes a metal component generally represented by the formula:

$$MR_x;$$

wherein M is a transition metal, R is a halogen, an alkoxy, or a hydrocarboxyl group and x is the valence of the transition metal. For example, x may be from 1 to 4.

In some embodiments, the rotational molded polyolefin was made using a gas-phase process and a Ziegler-Natta catalyst. For example, the Ziegler-Natta catalyst may be formed by contacting a transition metal halide with a metal alkyl or metal hydride. See, U.S. Pat. Nos. 4,298,718, 4,544,717, and 4,767,735; see also PCT Publication No. WO 2012/025379; which are each incorporated by reference herein.

The transition metal may be selected from Groups IV through VIB (e.g., titanium, chromium or vanadium) of the Periodic Table of Elements, for example. R may be selected from chlorine, bromine, carbonate, ester, or an alkoxy group in various embodiments. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with an activator, which is also referred to in some instances as a "co-catalyst". Embodiments of such Z-N activators include organoaluminum compounds, such as trimethyl aluminum (TMA), triethyl aluminum (TEAl) and triisobutyl aluminum (TiBAl), for example.

The Ziegler-Natta catalyst system may further include one or more electron donors, such as internal electron donors and/or external electron donors. The internal electron donors may include amines, amides, esters, ketones, nitriles, ethers, thioethers, thioesters, aldehydes, alcoholates, salts, organic acids, phosphines, diethers, succinates, phthalates, malonates, maleic acid derivatives, dialkoxybenzenes or combinations thereof, for example.

In one or more embodiments, the internal donor includes a $C_3$-$C_6$ cyclic ether, or a $C_3$-$C_5$ cyclic ether. For example, the cyclic ethers may be selected from tetrahydrofuran, dioxane, methyltetrahydrofuran and combinations thereof. (See, WO2012/025379, which is incorporated by reference herein.)

The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexylmethyldimethoxysilane (CMDS), diisopropyldimethoxysilane (DID S) and/or dicyclopentyldimethoxysilane (CPDS), for example. The external donor may be the same or different from the internal electron donor used. However, in one or more embodiments, the catalyst system is absent external donor.

The components of the Ziegler-Natta catalyst system (e.g., catalyst, activator and/or electron donors) may or may not be associated with a support, either in combination with each other or separate from one another. In one or more embodiments, the Z-N support materials may include a magnesium dihalide, such as magnesium dichloride or magnesium dibromide or silica, for example.

In one or more embodiments, the support may include a magnesium compound represented by the general formula:

$$MgCl_2(R''OH)_m;$$

wherein R'' is a $C_1$-$C_{10}$ alkyl and m is in a range of 0.5 to 3.

In one or more embodiments, the Ziegler-Natta catalyst system exhibits a molar ratio of support to metal component (measured as the amount of metal of each component) Mg:Ti of greater than 5:1, or in a range of 7:1 to 50:1, or 10:1 to 25:1, for example.

In one or more embodiments, the Ziegler-Natta catalyst system exhibits a molar ratio of support to internal donor Mg:ID of less than 3:1, or less than 2.9:1, or less than 2.6:1, or less than 2.1:1, or less than 2:1, or from 1.1:1 to 1.4:1, for example.

In some embodiments, the polyethylene pellets that are produced in the resin manufacturing process are not be used for rotational molding; and are instead reduced to a much smaller particle size. In some embodiments, this reduction is done to obtain good heat transfer from the mold to the powder. In some embodiments, the reduction also improves the flow of the particles during melting so that oxidation does not inhibit the moldability and development of the physical properties of the resin.

U.S. Pat. No. 6,902,695, which is incorporated herein by reference, provides additional information regarding methods and processes that may be used for the production of polyolefin-based articles of manufacture that may be used in accordance with this disclosure.

Embodiments and examples of some of the principles and techniques relevant to the testing methods disclosed herein are provided in *Practical Process Research & Development* (2012), which is incorporated herein by reference.

These methods may be further modified and optimized for preparative, pilot- or large-scale production, either batch of continuous, using the principles and techniques of process chemistry as applied by a person skilled in the art. Such principles and techniques are taught, for example, in Anderson, *Practical Process Research & Development—A Guide for Organic Chemists* (2012), which is incorporated by reference herein.

V. Definitions

The use of the word "a" or "an," when used in conjunction with the term "comprising" in the claims and/or the specification, may mean "one," but it is also consistent with the meaning of "one or more," "at least one," and "one or more than one."

Throughout this application, the term "about" is used to indicate that a value includes the variation of error for the device, or the method being employed to determine the value, or the variation that exists among the studies.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

A "method" is a series of one or more steps undertaken that lead to a final product, result or outcome. As used herein, the word "method" is used interchangeably with the word "process."

The term "olefin" as used in this application refers to an alkene wherein at least one carbon-carbon double bond in the molecule is a terminal double bond. Some non-limiting examples of olefins include styrene, ethylene, propylene, 1-butene (butene), pentene, 1-hexene (hexene), heptene, octene, nonene, decene, or dodecene.

In the present description, the term "homopolymer" and similar terms mean a polymer consisting solely or essentially of units derived from a single kind of monomer, e.g., ethylene homopolymer is a polymer comprising solely or essentially of units derived from ethylene, and propylene homopolymer is a polymer comprising solely or essentially of units derived from propylene, and the like.

In the present description, the term "interpolymer" means a polymer prepared by the polymerization of at least two types of monomers or comonomers. It includes, but is not limited to, copolymers (which can refer to polymers prepared from two different types of monomers or comonomers, although it can be used interchangeably with "interpolymer" to refer to polymers made from three or more different types of monomers or comonomers), terpolymers (which can refer to polymers prepared from three different types of monomers or comonomers), tetrapolymers (which can refer to polymers prepared from four different types of monomers or comonomers), and the like.

In the present description, the terms "monomer" and "comonomer" are used interchangeably. The terms mean any compound with a polymerizable moiety that is added to a reactor in order to produce a polymer. In those instances in which a polymer is described as comprising one or more monomers, e.g., a polymer comprising propylene and ethylene, the polymer comprises units derived from the monomers, e.g., —$CH_2$—$CH_2$—, and not the monomer itself, e.g., $CH_2$=$CH_2$.

In the present description, the term "polymer" means a macromolecular compound prepared by polymerizing monomers of the same or different type. The term "polymer" includes homopolymers, copolymers, terpolymers, interpolymers, and so on.

In the present description, the term "polymer composition" refers to a composition made from and/or containing at least one polymer. The term "resin formulation" is used interchangeably with the term polymer composition.

In the present description, the term "polyolefin" as used herein includes polymers such as polyethylene, polypropylene, polybutene, and ethylene copolymers having at least about 50 percent by weight of ethylene polymerized with a lesser amount of a comonomer such as vinyl acetate, and other polymeric resins within the "olefin" family classification.

Polyolefins may be made by a variety of processes including batch and continuous processes using single, staged or sequential reactors, slurry, solution, and fluidized bed processes and one or more catalysts including for example, heterogeneous and homogeneous systems and Ziegler-Natta, Phillips, metallocene, single-site, and constrained geometry catalysts to produce polymers having different combinations of properties. Such polymers may be highly branched or substantially linear and the branching, dispersity, and average molecular weight may vary depending upon the parameters and processes chosen for their manufacture in accordance with the teachings of the polymer arts.

In the present description, the terms "Ziegler-Natta-catalyzed polymer" and "Z-N-catalyzed polymer" mean any polymer that is made in the presence of a Ziegler-Natta catalyst.

The above definitions supersede any conflicting definition in any reference that is incorporated by reference herein. The fact that certain terms are defined, however, should not be considered as indicative that any term that is undefined is indefinite. Rather, all terms used are believed to describe the appended claims in terms such that one of ordinary skill can appreciate.

VI. Testing Methods

"ARM Impact Percent Ductility" (or "ARM % ductility") is determined according to Procedure A from Association of Rotational Molders (ARM) Low Temperature Impact Test version 4.0, published July 2003, using a 10 lb (4.54 kg) dart, a ⅛ inch (0.32 cm) sample wall thickness, at a temperature of −40° C. The "ARM Impact Percent Ductility" corresponds to the percentage of the failures that are ductile, rather than brittle. If there are no brittle failures the ARM % ductility will be 100%, and if the failures are all brittle the ARM % ductility will be 0%.

Melt index (MI) is given in gram/10 min and is measured using ASTM D1238, which is entitled "Test Method for Melt Flow Rates of Thermoplastics by Extrusion Plastometer," under the conditions specified below. It has become customary to refer to the flow rate of polyethylene as "melt index" when obtained under Condition 190/2.16. The term "ASTM D1238" as used herein refers to a standard test method for determining melt flow rates of thermoplastics carried out by an extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved Aug. 1, 2013, the contents of which are incorporated herein by reference in its entirety. For the referenced ASTM standards, visit the ASTM website, www.astm.org, or contact ASTM Customer Service at service@astm.org.

The Yellowness Index is measured in accordance with ASTM E313 15e1, "Standard Practice for Calculating Yellowness and Whiteness Indices from Instrumentally Measured Color Coordinates." The terms "ASTM E313" or "ASTM E313 15e1" as used herein refer to the test method approved Jan. 1, 2015, the content of which is incorporated herein by reference in its entirety. For the referenced ASTM standards, visit the ASTM website, www.astm.org, or contact ASTM Customer Service at service@astm.org.

The polydispersity of the samples were analyzed for Mw, Mn, and Mw/Mn by gel permeation chromatography (GPC) using a PolymerChar GPC high temperature system equipped with an Infrared Detector, Agilent Olexis column and operating at a system temperature of 145° C. The solvent used was 1,2,4 trichlorobenzene, from which polymer sample solutions of 2.0 mg/ml concentration were prepared for injection. The total solvent flow rate was 1.0 ml minute and the injection size was 200 microliters. GPC columns were calibrated using a series of narrow polystyrenes (obtained from PSS-Polymer Standards Service—USA Inc.). For quality control, a broad MWD internal control HDPE was used. The control was run with each batch of samples. It was injected twice as the first and second samples of each batch. After elution of the polymer samples, the resulting chromatograms were analyzed using the PolymerChar PolymerOne software to calculate the molecular weight distribution and Mn and Mw averages.

IX. Examples

The following examples are included to demonstrate embodiments of the appended claims. Those of skill in the art should appreciate that many changes can be made in the specific embodiments which are disclosed and still obtain a like or similar result without departing from the spirit and scope of the disclosure herein.

Compounding: the formulations of the present examples were melt compounded in an 18-mm co-rotating twin screw extruder at a screw speed of 175 RPM and the following temperature profile, achieving a melt temperature of 212° C. The resins of the present examples were ground to an average 35-mesh particle size, then tumble blended with the various additives (as indicated in Table 1) for 5 minutes prior to compounding.

| Zone 1 | Zone 2 | Zone 3 | Zone 4 | Zone 5 | Zone 6 | Die |
|---|---|---|---|---|---|---|
| 177 | 199 | 210 | 210 | 210 | 210 | 210 |

Rotational Molding: The present examples were rotational molded in a Ferry Rotospeed™ RS1-120 rotational molding system. The mold used was a rectangular aluminum mold with dimensions of 20 inches by 13 inches by 3.5 inches. The rotation speeds were 8 RPM for the arm and 2 RPM for the plate. The parts of the present examples were molded at an oven temperature of 550° F., with the heating cycle time being varied to determine the curing behavior of the resin. Cooling was done with forced air, with the cooling cycle lasting 3 minutes longer than the heating cycle for the part.

Resin formulations 1-3 were prepared as follows: The additives (as indicated in Table 1) was mixed with an HDPE resin having 2.2% 1-hexene monomer, a melt flow rate of 1.8. g/10 minutes, an Mw/Mn of 5, and a density of 0.943 g/cm³ using the weights (ppm, based on the overall formulation) given in Table 1. The blended compositions of each of resin formulations 1-3 were withdrawn from the mixer into a dump extruder, extruded through a die and pelletized, and later tested for ARM Impact Percent of Ductile Failure.

Impact testing was done per the Association of Rotational Molders International, "Low Temperature Impact Test," Version 4.0, published July 2003, Procedure A (10 lb dart), at a temperature of −40° C. The percent of ductile failure of the resin formulations ("ARM Impact Percent Ductility") at various cure times are provided in Table 2.

The Yellowness Index was measured in accordance with ASTM E313, as defined above. The Yellowness Index of the resin formulations after 22.0 minutes cure time are provided in Table 3.

These results demonstrate that incorporation of DHT-4V (a dihydrotalcite-based acid scavenger) reduces the decline in impact strength at long cure times (reducing the portion of brittle failures and reducing the amount of time during which the brittle failures occur). The formulations tested and impact ductility results are shown in Tables 1 and 2 and in the FIGURE.

TABLE 1

Additive Amounts (ppm) in the Resin Formulations

| Formulation | IRGANOX ® 3114 | IRGAFOS ® 168 | Zinc Stearate | CYASORB ® UV-3346 | DHT-4V |
|---|---|---|---|---|---|
| Comparative 1 | 325 | 900 | 350 | 2000 | 500 |
| 2 | 325 | 900 | 350 | 2000 | 1000 |
| Comparative 3 | 325 | 900 | 350 | 2000 | 0 |

TABLE 2

ARM Impact Percent of Ductile Failure of Resin Formulations at Various Cure Times

| Formulation | 18.0 min | 19.0 min | 20.0 min | 21.0 min | 22.0 min | 23.0 min | 24.0 min |
|---|---|---|---|---|---|---|---|
| Comparative 1 | 100 | 100 | 90 | 55 | 100 | 100 | 100 |
| 2 | 100 | 100 | 80 | 90 | 100 | 100 | 100 |
| Comparative 3 | 100 | 100 | 80 | 30 | 70 | 80 | 91 |

TABLE 3

Yellowness Index of Resin Formulations

| Formulation | Yellowness Index at 22.0 Minute Cure Time |
|---|---|
| Comparative 1 | 32.2 |
| 2 | 27.5 |
| Comparative 3 | 28.9 |

All of the compositions, articles of manufacture, and methods disclosed and claimed herein can be made and executed without undue experimentation in light of the present disclosure. While the compositions, articles of manufacture, and methods of this disclosure have been described in terms of certain embodiments, it will be apparent to those of skill in the art that variations may be applied to the compositions, articles of manufacture, and methods, as well as in the steps or in the sequence of steps of the methods described herein without departing from the concept, spirit, and scope of the appended claims.

REFERENCES

The following references to the extent that they provide exemplary procedural or other details supplementary to those set forth herein, are specifically incorporated herein by reference.

U.S. Pat. No. 3,539,306
U.S. Pat. No. 3,650,704
U.S. Pat. No. 3,886,105
U.S. Pat. No. 4,298,718
U.S. Pat. No. 4,544,717
U.S. Pat. No. 4,767,735
U.S. Pat. No. 5,250,279
U.S. Pat. No. 5,589,555
U.S. Pat. No. 6,084,042
U.S. Pat. No. 6,902,695
U.S. Patent Publication No. 2015/0045479
PCT Publication No. WO 2012/025379
Anderson, N. G., *Practical Process Research & Development—A Guide for Organic Chemists*, $2^{nd}$ ed., Academic Press, New York, 2012.
Association of Rotational Molders International, "Low Temperature Impact Test," Version 4.0, published July 2003.
ASTM D1238, "Test Method for Melt Flow Rates of Thermoplastics by Extrusion Plastometer," approved Aug. 1, 2013.
ASTM E313 15e1, "Standard Practice for Calculating Yellowness and Whiteness Indices from Instrumentally Measured Color Coordinates," approved Jan. 1, 2015.
Misra & Perrotta, *Clays and Clay Minerals*, 40(2): 145-50, 1992.
Salomão et al., *Ceramics International*, 37(8):3063-70, 2011.

What is claimed is:

1. A composition comprising:
   (a) a polyolefin, comprising polyethylene or a copolymer thereof, having a melt index (MI) ranging from about 1 g/10 minutes to about 10 g/10 minutes; and
   (b) an additive package comprising:
       an antioxidant;
       a processing stabilizer; and
       a dihydrotalcite-based acid scavenger present in the composition at between about 900 ppm and about 1,500 ppm, wherein the dihydrotalcite-based acid scavenger comprises a hydrotalcite.

2. The composition of claim 1, wherein the polyolefin comprises an ethylene-hexene copolymer having a 1-hexene content ranging from about 1.5% by weight to about 6.5% by weight; a $M_w/M_n$ ranging from about 3 to about 7; and a density ranging from about 0.935 to about 0.946 g/cm³.

3. The composition according to claim 1, wherein the antioxidant is a sterically hindered phenolic antioxidant.

4. The composition of claim 3, wherein the sterically hindered phenolic antioxidant is 1,3,5-tris[4-hydroxy-3,5-bis(2-methyl-2-propanyl)benzyl]-1,3,5-triazinane-2,4,6-trione, further wherein the sterically hindered phenolic antioxidant is present in the composition at between about 200 ppm to about 500 ppm.

5. The composition of claim 1, wherein the processing stabilizer is a hydrolytically stable organophosphite processing stabilizer.

6. The composition of claim 5, wherein the processing stabilizer is tris(2,4-di-tert-butylphenyl)phosphite, wherein the processing stabilizer is present in the composition at between about 500 ppm to about 1,500 ppm.

7. The composition of claim 1, wherein the additive package further comprises a UV light stabilizer and a fatty acid-based acid scavenger comprising a metal salt of a fatty acid.

8. The composition of claim 7, wherein the UV light stabilizer is a polymer or oligomer comprising hindered amine groups.

9. The composition of claim 8, wherein the UV light stabilizer is present in the composition at between about 1,000 ppm to about 3,000 ppm.

10. The composition of claim 7, wherein the fatty acid is zinc stearate and the UV light stabilizer is poly [(6-morpholino-s-triazine-2,4-diyl)[2,2,6,6-tetramethyl-4-piperidyl) imino]-hexamethylene [(2,2,6,6-tetramethyl-4-piperidyl) imino]].

11. The composition of claim 10, wherein the zinc stearate is present in the composition at between about 200 ppm to about 500 ppm.

12. The composition of claim 1, wherein the dihydrotalcite-based acid scavenger comprises magnesium aluminum hydroxy carbonate or a hydrate thereof.

13. The composition of claim 12, wherein the dihydrotalcite-based acid scavenger further comprises a surface active agent.

14. The composition of claim 12, wherein the dihydrotalcite-based acid scavenger is present in the composition at about 1000 ppm.

15. The composition of claim 1, wherein the ARM Impact Percent Ductility is greater than or equal to about 60% for a molded part having a wall thickness of about ⅛ inch (0.32 cm) and made from the cured composition and measured after the composition has been cured between 18-24 minutes at a temperature of 550° F.

16. The composition of claim 1, wherein the yellowness index of the composition is less than or equal to about 30 after the composition has been cured between 18-24 minutes at a temperature at a temperature of 550° F., wherein the yellowness index of the composition is determined according to ASTM E313 15e1.

17. An article formed from the composition of claim 1.

18. The article of claim 17, wherein the article is a rotomolded part.

* * * * *

UNITED STATES PATENT AND TRADEMARK OFFICE
CERTIFICATE OF CORRECTION

PATENT NO. : 10,570,270 B2
APPLICATION NO. : 15/815437
DATED : February 25, 2020
INVENTOR(S) : Horwatt et al.

Page 1 of 1

It is certified that error appears in the above-identified patent and that said Letters Patent is hereby corrected as shown below:

In the Specification

In Column 2, Line 46, after "ppm." delete "In some embodiments,"
In Column 3, Line 3, delete "at a temperature at a temperature" and insert -- at a temperature --, therefor
In Column 4, Line 2, delete "at a temperature at a temperature" and insert -- at a temperature --, therefor
In Column 7, Line 13, delete "type" and insert -- types --, therefor
In Column 7, Line 48, delete "materbatch" and insert -- masterbatch --, therefor
In Column 13, Line 12, delete "time" and insert -- times --, therefor In the Claims In Column 16, Claim 16, Line 27, delete "at a temperature at a temperature" and insert -- at a temperature --, therefor Signed and Sealed this
Third Day of January, 2023

*Katherine Kelly Vidal*

Katherine Kelly Vidal
*Director of the United States Patent and Trademark Office*